(12) United States Patent
Ho et al.

(10) Patent No.: US 9,489,090 B2
(45) Date of Patent: Nov. 8, 2016

(54) CAPACITIVE TOUCH PANEL AND A METHOD OF MANUFACTURING THE SAME

(75) Inventors: Kwan-Sin Ho, Miaoli (TW); Hao Zhang, Jishou (CN)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 51 days.

(21) Appl. No.: 13/409,023

(22) Filed: Feb. 29, 2012

(65) Prior Publication Data

US 2013/0038571 A1    Feb. 14, 2013

(30) Foreign Application Priority Data

Aug. 12, 2011  (CN) .......................... 2011 1 0235016

(51) Int. Cl.
  *G06F 3/045*    (2006.01)
  *G06F 3/044*    (2006.01)

(52) U.S. Cl.
  CPC ...... *G06F 3/044* (2013.01); *G06F 2203/04111* (2013.01); *Y10T 29/49155* (2015.01)

(58) Field of Classification Search
  CPC .............................................. G06F 2203/04107
  USPC ............... 345/156, 157, 173, 174; 178/18.06
  See application file for complete search history.

(56) References Cited

U.S. PATENT DOCUMENTS

| | | | | |
|---|---|---|---|---|
| 4,320,418 A * | 3/1982 | Pavliscak | ...................... | 348/797 |
| 5,565,742 A * | 10/1996 | Shichao et al. | ................ | 315/366 |
| 6,605,826 B2 * | 8/2003 | Yamazaki et al. | ............... | 257/72 |
| 8,593,410 B2 * | 11/2013 | Hong et al. | .................... | 345/173 |
| 8,638,399 B2 * | 1/2014 | Wang et al. | .................... | 349/12 |
| 8,722,313 B2 * | 5/2014 | Shin | ............................... | 430/319 |
| 2004/0075779 A1 * | 4/2004 | Paukshto | ............. | G02F 1/13338 349/12 |
| 2009/0002588 A1 * | 1/2009 | Lee | .................... | G02F 1/133707 349/42 |
| 2010/0136868 A1 * | 6/2010 | Chien | .................... | G06F 3/0412 445/24 |
| 2010/0164881 A1 * | 7/2010 | Kuo et al. | ...................... | 345/173 |
| 2011/0007020 A1 | 1/2011 | Hong et al. | | |
| 2011/0157086 A1 * | 6/2011 | Ozeki | ...................... | G06F 3/044 345/174 |
| 2011/0157093 A1 * | 6/2011 | Bita et al. | ...................... | 345/175 |
| 2011/0248944 A1 * | 10/2011 | Liu et al. | ....................... | 345/173 |
| 2011/0267289 A1 * | 11/2011 | Park | ........................ | G06F 3/044 345/173 |
| 2011/0304582 A1 * | 12/2011 | Ho et al. | ........................ | 345/174 |
| 2012/0075209 A1 * | 3/2012 | Lee et al. | ....................... | 345/173 |
| 2012/0127578 A1 * | 5/2012 | Bright et al. | ................... | 359/585 |
| 2012/0181633 A1 * | 7/2012 | Miyata | ........................ | 257/411 |
| 2012/0182230 A1 * | 7/2012 | Wang | ...................... | G06F 3/044 345/173 |

FOREIGN PATENT DOCUMENTS

| | | |
|---|---|---|
| CN | 101464761 A | 6/2009 |
| CN | 201352342 Y | 11/2009 |
| CN | 101989160 | 3/2011 |
| JP | 2009265748 | 11/2009 |
| JP | 2011090443 | 5/2011 |
| JP | 2011128674 | 6/2011 |

* cited by examiner

*Primary Examiner* — Ilana Spar
*Assistant Examiner* — Kirk Hermann
(74) *Attorney, Agent, or Firm* — Cooper Legal Group, LLC

(57) ABSTRACT

The present invention relates to a touch technology and provides a capacitive touch panel which has low-visibility metal jumper. The touch panel comprises of a transparent substrate and at least one metal juniper. A mask layer, reflectance of which is lower than that of the metal jumper, is set between the metal jumper and the transparent substrate to block the light reflected by the metal jumper. The mask layer can reduce light reflection of the metal jumper so as to reduce visibility of the metal jumper.

23 Claims, 5 Drawing Sheets

CAPACITIVE TOUCH PANEL AND A METHOD OF MANUFACTURING THE SAME

BACKGROUND OF THE INVENTION

This Application claims the benefit of the People's Republic of China Application No. 201110235016.7, filed on Aug. 12, 2011.

FIELD OF THE INVENTION

The present invention relates to touch technology, and more particular to a capacitive touch panel and a method of manufacturing the panel to improve the appearance and optical performance of the touch panel.

DESCRIPTION OF THE RELATED ART

In recent years, with continuous development of touch technology, touch panels have been widely used in various electronic products, such as mobile phones, personal digital assistants (PDA), input interfaces in game consoles and computer touch screens. In practical application, touch panels are usually integrated with display panels. Users can use a finger, a stylus or other objects to click images and words displayed on the display panel to conduct corresponding input and operation conveniently. According to different working principles, touch panels can be classified into capacitive touch panels, resistive touch panels, acoustic touch panels, infrared sensing touch panels and electromagnetic touch panels, etc. Among them, capacitive touch panels are more widely used due to the characteristics of high sensitivity, low cost and simple structure. Working principle of capacitive touch panels uses inductive capacitance of the human body, wherein when the human body touches the touch panel, a part of electric charges is taken away to form induced current signals, which is transmitted to the controller. The controller then figures out the location of the touch point based on the induced current signals received.

A capacitive touch panel usually comprises a. transparent substrate, a sensing circuit layer, and a protective layer. The sensing circuit layer is set between the transparent substrate and the protective layer and comprises of a plurality of electrodes placed on a surface of the transparent substrate. The electrodes can be arranged in several ways, such as single paralleled axis, two mutually vertical axes, radial pattern and helical pattern, etc., to form a certain electrode pattern for sensing the touch and generating sense signals.

Referring to FIG. 1, FIG. 2 and FIG. 3, a capacitive touch panel 10 comprises a transparent substrate 1, a sensing circuit layer 2, a protective layer 4, and a black matrix 5. The upper surface 11 of the transparent substrate 1 is used for touching while the sensing circuit layer 2 is set on the lower surface 12 and surface of the sensing circuit layer 2 is covered by the protective layer 4. The sensing circuit layer 2 comprises a plurality of first-axis electrodes 21 and second-axis electrodes 22, located on X-axis and Y-axis of the vertical coordinate axes respectively. Each first-axis electrode 21 has a plurality of first electrodes 211 and first-axis wires 212 connected to two adjacent first electrodes 211. Each second-axis electrode 22 has a plurality of second electrodes 221 and second-axis wires 222 connected to two adjacent second electrodes 221. Lower surfaces of the first-axis wires 212 have insulating sheets 31, by which the first-axis wires 212 and the second-axis wires 222 are insulated. Metal circuits 23 for transmitting signals are set around the sensing circuit layer 2. The black matrix 5 is laminated around the lower surface 12 of the transparent substrate to cover the metal circuits 23.

Transparent conductive materials such as indium tin oxide (ITO) and antimony tin oxide (ATO) are usually used in practical production. After being processed by sputtering, etching or printing, the first electrodes 211, first-axis wires 212, and the second electrodes 221 are formed synchronously on the lower surface 12 of the transparent substrate 1. The insulating sheets 31 are then set on the lower surfaces of the first-axis wires 212, and the second-axis wires 222 are set across the insulating sheets 31 and connect two adjacent second electrodes 221. Due to good electrical conductivity and low cost of metal materials (such as aluminum, silver, chromium. copper, etc.), metal wires (metal jumpers), which are made of metal materials, are usually selected for the second-axis wires 222. However, metal jumpers have a certain width, and reflectance of metal materials is relatively high, which is different from the surrounding transparent conductive material and the transparent substrate, and therefore human eyes can perceive the obvious difference, leading to the product's defective appearance with the metal jumpers being visible.

In order to improve the appearance of touch panel and solve the problem that the metal jumpers are visible, the method adopted in the existing technology is mainly to reduce exterior sizes of the metal jumpers and making the line width very small. However, in practical production, this method is hard to be realized, easy to cause reduction in production yield, and unable to completely eliminate the problem that the metal jumpers are visible on the touch panel.

SUMMARY OF THE INVENTION

In order to solve the above problem that the metal jumpers are visible and to overcome deficiency of the existing technology, it is an object of the present invention to provide a capacitive touch panel which has low-visibility metal jumpers and good optical characteristics and visual effect.

A capacitive touch panel comprises a transparent substrate and at least one metal jumper. A mask layer, reflectance of which is lower than that of the metal jumper, is set between the metal jumper and the transparent substrate to block the light reflected by the metal jumper.

The transparent substrate has a first surface available for touching and a second surface opposite to the first surface. The capacitive touch panel also comprises a sensing circuit layer used to sense the touch and generate sense signals. The sensing circuit layer is placed on the second surface of the transparent substrate, comprising at least a plurality of first electrodes and a plurality of second electrodes. Adjacent first electrodes are electrically connected through a first-axis wire. The metal jumper is set between the adjacent second electrodes to electrically connect the adjacent second electrodes while the metal jumper and the first electrodes are electrically insulated.

The mask layer is placed on the second surface of the transparent substrate, comprising at least one mask piece. Location and size of the mask piece correspond to those of the metal jumper. The mask layer can also be used as an insulating sheet, placed on the metal jumper. Width of the insulating sheet is less than the length of the metal jumper but not less than the width of the metal jumper. The mask layer is made of grey, brown or black non-conductive mask material, comprising black photoresistive material, brown photoresistive material, grey photoresistive material, nitride, oxide or mixture of nitride and oxide.

It is another object of the present invention to provide a method for reducing visibility of the metal jumper in a capacitive touch panel, which can improve the optical characteristics of the capacitive touch panel for good appearance while ensuring high production yield and low cost.

Technical schemes adopted in the present invention:
With regard to a method for reducing visibility of a metal jumper in a capacitive touch panel, the capacitive touch panel comprises a transparent substrate which has a first surface used for touching and a second surface opposite to the first surface. The method comprises the following steps: placing at least one metal jumper on the second surface of the transparent substrate; coating a mask layer corresponding to the metal jumper between the transparent substrate and the metal jumper, wherein reflectance of the mask layer is lower than that of the metal juniper.

Before placing the metal jumper on the second surface of the transparent substrate, the method also comprises the following step: placing a sensing circuit layer on the second surface of the transparent substrate, wherein the sensing circuit layer comprises at least two electrodes and the metal jumper is connected between the two electrodes.

The mask layer is made of grey, brown or black non-conductive mask material, comprising black photoresistive material, brown photoresistive material, grey photoresistive material, nitride, oxide or mixture of nitride and oxide. In the present disclosure, a mask layer is added between the transparent substrate and the metal jumper: The mask layer is made of black or melanocratic non-conductive materials, which can reduce light reflection of the metal jumper and reduce visibility of the metal jumper so that it is not easy to be perceived by human eyes thereby making the capacitive touch panel a good visual effect. With regard to the method for reducing visibility of the metal jumper in a capacitive touch panel provided in the present invention, it can improve the optical characteristics and appearance effect of the product without adding additional process while the cost is almost not increased.

DETAILED DESCRIPTION OF THE EMBODIMENTS

Figure 1:
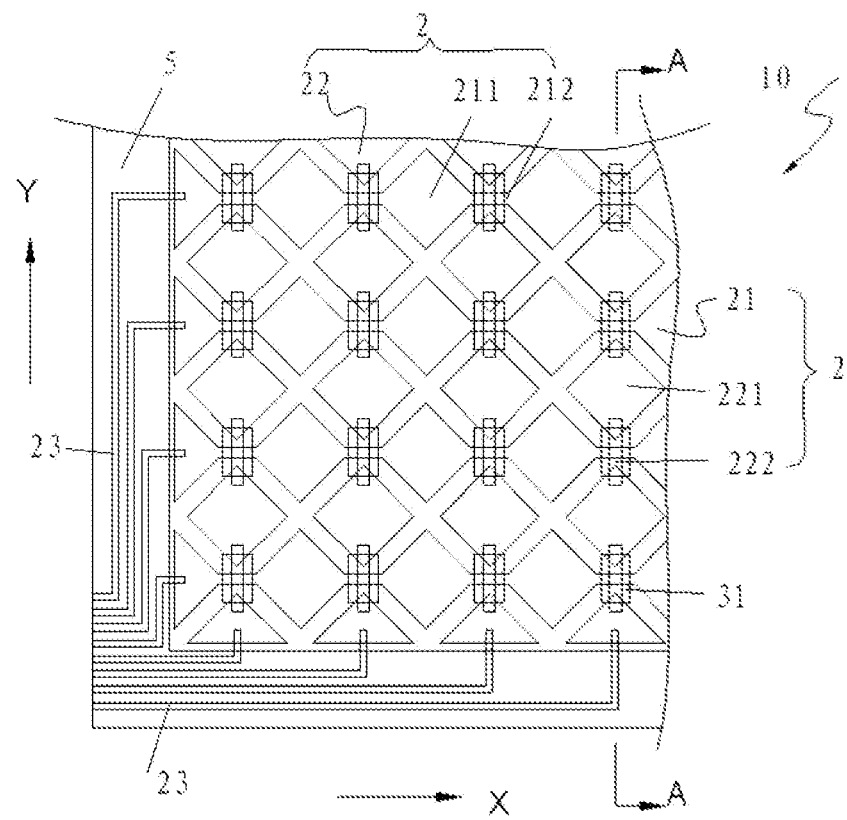
FIG. 1 is a perspective view of a partial plan structure of an existing capacitive touch panel.
Figure 2:
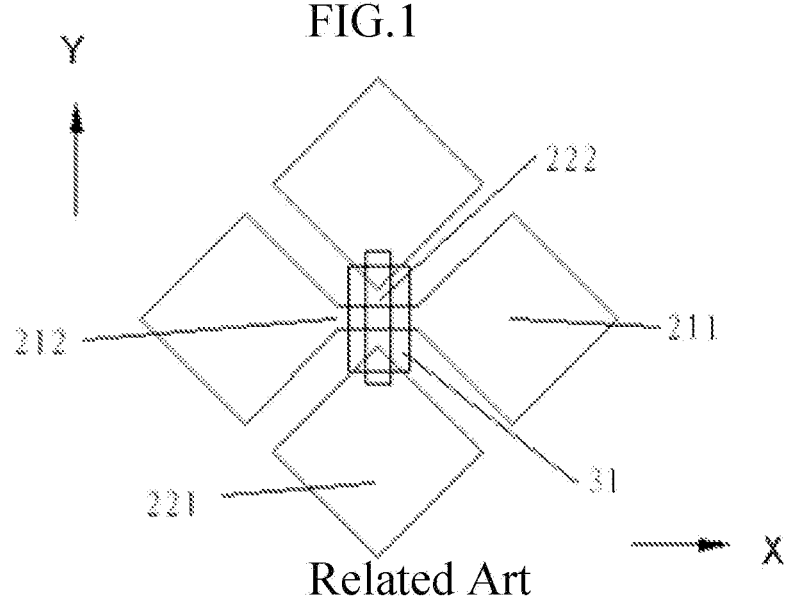
FIG. 2 is a partially enlarged view of the structure of the transparent electrode layer shown in FIG. 1.
Figure 3:
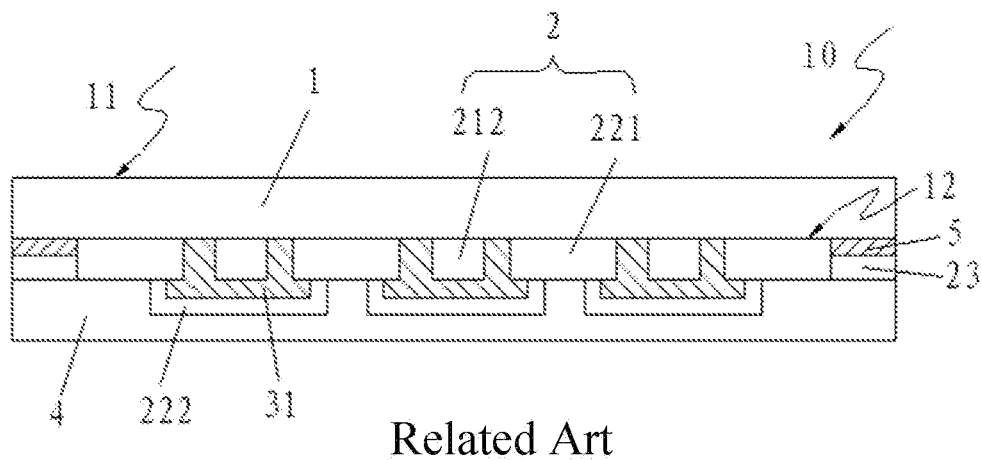
FIG. 3 is a schematic sectional view of an existing capacitive touch panel in accordance with A-A shown in FIG. 1.
Figure 4:
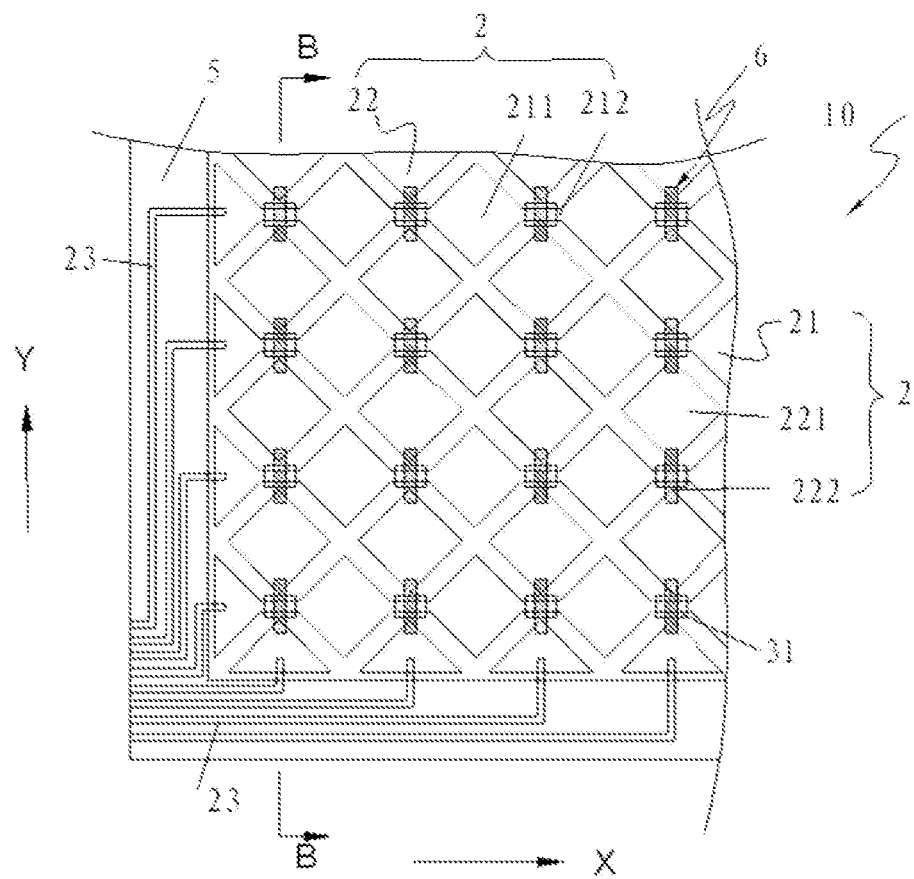
FIG. 4 is a perspective view of a partial plan structure of a capacitive touch panel in accordance with the present invention.
Figure 5:
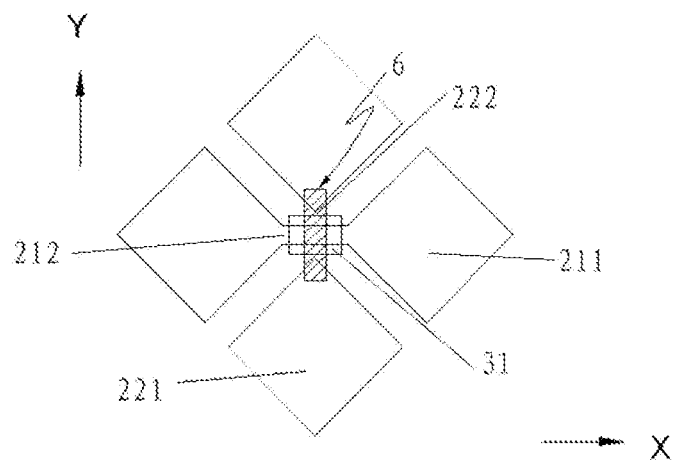
FIG. 5 is a partially enlarged view of the structure of the electrode layer shown in FIG. 4.
Figure 6A:
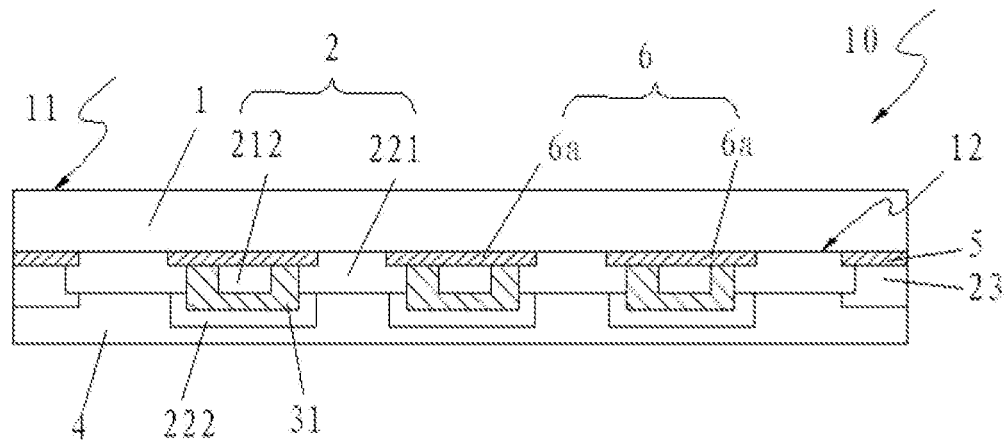
FIG. 6A is a schematic sectional view the structure of the electrode layer in accordance. with B-B shown in FIG. 4.

The First Embodiment
Referring to FIG. 4, FIG. 5 and FIG. 6A, a capacitive touch panel 10 comprises a transparent substrate 1, a sensing circuit layer 2, a protective layer 4, a black matrix 5 and a mask layer 6. The sensing circuit layer 2 is set between the transparent substrate 1 and the protective layer 4, and is placed on the lower surface 12 of the transparent substrate 1 while the upper surface 11 is used for touching. The sensing circuit layer 2 comprises a plurality of first-axis electrodes 21 and second-axis electrodes 22, located on X-axis and Y-axis of the vertical coordinate axes respectively. Each first-axis electrode 21 has a plurality of first electrodes 211 and first-axis wires 212 connected to two adjacent first electrodes 211; each second-axis electrode 22 has a plurality of second electrodes 221 and second-axis wires 222 connected to two adjacent second electrodes 221. Metal jumpers are usually used for the second-axis wires 222; the first-axis wires 212 and the second-axis wires 222 are insulated by the insulating sheets 31. The mask layer 6 is laminated on the lower surface 12 of the transparent substrate 1 and divided into a plurality of mask pieces 6a. In an embodiment, location and size of each mask piece 6a correspond to those of the second-axis wire 222 (metal jumper), and the reflectance is lower than that of the metal jumper so as to reduce light reflection of the metal jumper and reduce visibility of the metal jumper. Metal circuits 23 used for transmitting signals are set around the sensing circuit layer 2. The black matrix 5 is laminated around the lower surface 12 of the transparent substrate to cover the metal circuits 23 so that the metal circuits 23 are not exposed on the surface of the transparent substrate 1, beautifying the touch panel's appearance.

Usually, by using transparent conductive materials such as indium tin oxide (ITO) and antimony tin oxide (ATO) and after processing by sputtering, etching or printing, the first electrodes 211, first-axis wires 212, and the second electrodes 221 are formed synchronously on the lower surface 12 of the transparent substrate 1. The insulating sheets 31 are then set on the lower surfaces of the first-axis wires 212 and the metal jumpers, acting as the second-axis wires 222, are set across the insulating sheets 31, wherein the metal jumpers connect two adjacent second electrodes 221.

In an embodiment, the insulating sheets 31 are placed between two adjacent second electrodes 221 on the same axis, and width (along Y-axis) of the insulating sheets 31 is more than width (along Y-axis) of the first-axis wires 212 but less than length (along Y-axis) of the second-axis wires 222. For the existing capacitive touch panel, if the metal jumpers are laminated directly on the transparent substrate 1, the touch panel may break easily and the yield will be low. Thus, in order to increase yield of the touch panel products, width (along Y-axis) of the insulating sheets 31 should not be less than the distance between two adjacent second electrodes 221. In practice, due to tolerance and other factors, mode of more than the distance is usually adopted so that an insulating layer can be placed between the metal jumpers and the transparent substrate 1 to avoid direct contact. In the present embodiment, a mask layer 6 is set between the metal jumpers and the transparent substrate 1 to avoid the metal jumpers from getting laminated directly on the transparent substrate 1. In this way, there is no limitation on width of the insulating sheets 31, which means that the width not only can be more than the distance between two adjacent second electrodes 221 but also can be less than or equal to the distance. Meanwhile, covering areas of the insulating sheets 31 can be narrowed correspondingly to reduce length of the metal jumpers so that the metal jumpers are less easily seen.

Figure 6B:
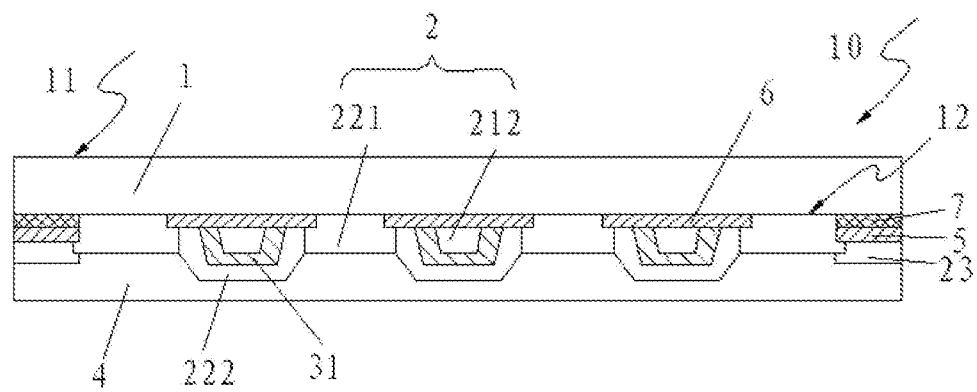
FIG. 6B is a schematic sectional view of another structure of the electrode layer in accordance with B-B shown in FIG. 4.

FIG. 6B demonstrates yet another schematic sectional view of the capacitive touch panel 10 in accordance with the first embodiment. It is similar to the above structure, but the difference lies in the width of the insulating sheets 31, wherein the width is less than the distance between two adjacent second electrodes 221. The insulating sheets 31 are covered on the surface of the first-axis wires 212. The metal jumpers, acting as the second-axis wires 222, are covered on the surface of the insulating sheets 31 and connect two adjacent second electrodes 221.

In an embodiment, the transparent substrate 1 is made of transparent non-conductive materials such as glass, PMMA, PVC, PP and PET, etc. The insulating sheets 31 are made of insulating materials such as silicon dioxide. The black matrix 5 and the mask layer 6 are made of black, grey or brown non-conductive materials, such as black photoresistive material, brown photoresistive material, grey photoresistive material, nitride, oxide or mixture of nitride and oxide. The mask layer 6 is made up of a plurality of mask pieces 6a which are set separately, wherein because the mask pieces 6a are very short and narrow with an area of $10^{-4}$ $mm^2$, they are not easy for people to discern them. Therefore, adding mask pieces can effectively block the light reflected by the metal jumpers and produce a good appearance of the touch panel.

Referring to FIG. 6B, a protective layer 7 that shields electromagnetic noise can also be set between the black matrix 5 and the transparent substrate 1. For transparent touch panel that sets a metal jumper as connection structure, a mask layer 6 can be added on the metal jumper to reduce the light reflected by the metal jumper and thereby reduce visibility of the metal jumper. Therefore, appearance effect of the transparent touch panel is improved. Structure of multi-layer sensing circuit layer can be adopted for the sensing circuit layer 2 and set based on the actual using requirement.

Accordingly, production of the above capacitive touch panel comprises the following steps:

A mask layer 6 is coated on the second surface 12 of the transparent substrate 1, comprising a plurality of mask pieces 6a set on the second surface 12 of the transparent substrate 1 at certain intervals. A transparent conducting layer is coated on the second surface 12 of the transparent substrate 1, forming a sensing circuit layer 2 with electrode pattern, wherein the sensing circuit layer 2 comprises a plurality of first electrodes 211, second electrodes 221, and first-axis wires 212 connected to two adjacent first electrodes 211. The insulating sheets 31 are then placed on the first-axis wires 212 by using transparent insulating materials after which the corresponding metal jumpers 222 and metal circuits 23 can be set, wherein the metal jumpers 222 are set across the insulating sheets 31 and configured to connect two adjacent second electrodes 221 on the same axis. In an embodiment, locations of the metal jumpers correspond to locations of the mask pieces 6a respectively. The metal circuits 23 are placed around the sensing circuit layer 2 for transmitting signals and finally, a protective layer 4 using silicon dioxide, organic polymer or other materials is set on the electrode layer 2. Besides, when coating the mask layer 6, a black matrix 5 can be coated around the second surface 12 of the transparent substrate 1 synchronously, and the black matrix 5 corresponds to the metal circuits 23. The mask layer 6 is made synchronously with the black matrix 5 so that the appearance can be improved without increasing the cost. If a protective layer 7 needs to be added, the protective layer 7, usually made of metal materials, should be placed on the edge of the transparent substrate 1 before setting the mask layer 6 and the black matrix 5.

The Second Embodiment

Figure 7A:
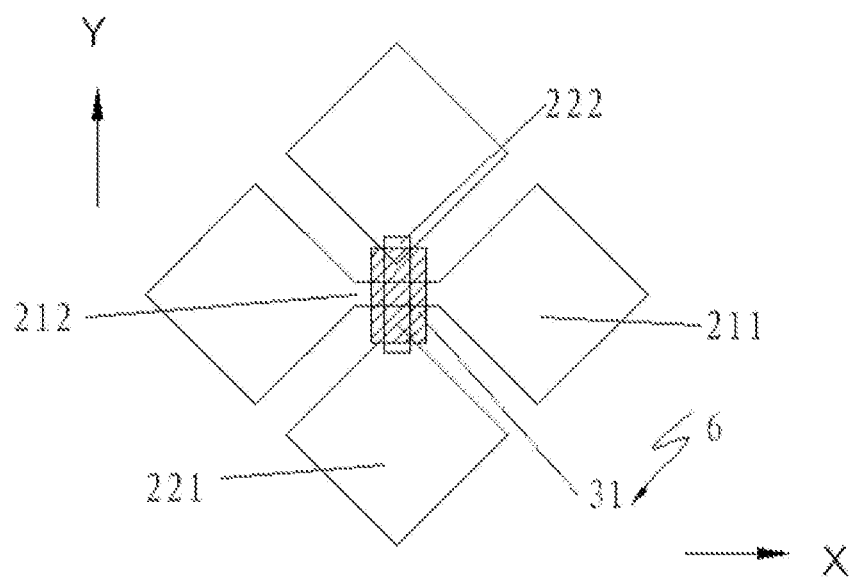
FIG. 7A is a schematic partial view of the structure of an electrode layer in accordance with a second embodiment of the present disclosure.
Figure 7B:
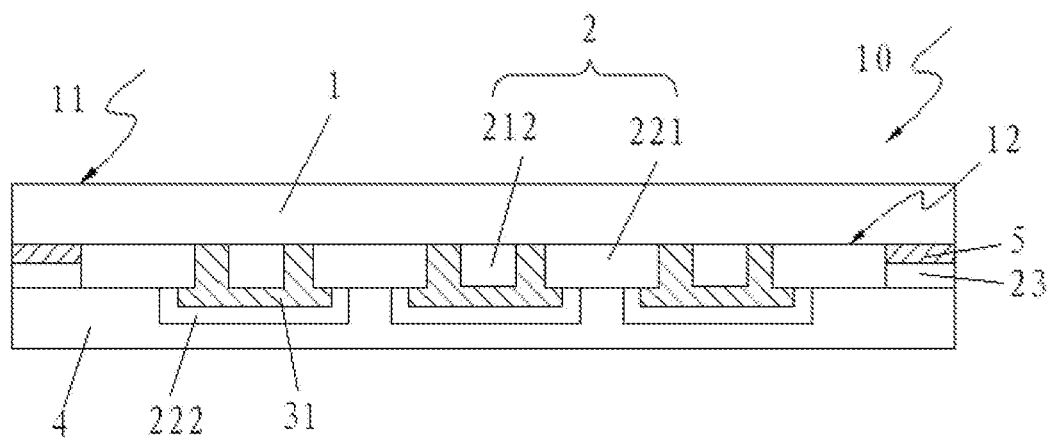
FIG. 7B is a schematic sectional view of the second embodiment of the present disclosure in accordance with B-B shown in FIG. 4.

Referring to FIG. 7A and FIG. 7B, for a capacitive touch panel 10, the structure is similar to the first embodiment and comprises of a transparent substrate 1, a sensing circuit layer 2, a protective layer 4, a black matrix 5, and a mask layer 6. First electrodes 211, first-axis wires 212. and second electrodes 221 of the sensing circuit layer 2 are placed on a second surface 12 of the transparent substrate 1. Second-axis wires 222 are metal jumpers; the first-axis wires 212 and the metal jumpers are insulated by insulating sheets 31. The insulating sheets 31 are made of black or melanocratic insulating materials, act as a mask layer, and are placed above the metal jumpers. Width (along Y-axis) of the insulating sheets 31 is more than width (along Y-axis) of the first-axis wires 212 but less than length (along Y-axis) of the second-axis wires 222. Length (along X-axis) of the insulating sheets 31 is not less than the width (along X-axis) of the second-axis wires 222 so that the metal jumpers are insulated from the first-axis wires 212 and connect two adjacent second electrodes 221. In this way, the insulating sheets 31 can reduce light reflection of the metal jumpers so as to reduce visibility of the metal jumpers.

Production of the capacitive touch panel comprises the following steps:

A transparent conducting layer is coated on the second surface 12 of the transparent substrate 1. A sensing circuit layer 2 is formed with an electrode pattern after a etching process, wherein the electrode pattern comprises of a plurality of first electrodes 211, second electrodes 221, and first-axis wires 212, which are connected to two adjacent first electrodes 211. Insulating sheets 31 can be placed on the first-axis wires 212 by using melanocratic or black insulating materials, wherein the insulating sheets 31 act as mask pieces; and then metal jumpers 222 and metal circuits 23 are set. The metal jumpers 222 are set across the insulating sheets 31 and connect two adjacent second electrodes 221. The metal circuits 23 are placed around the sensing circuit layer 2 for transmitting signals. Melanocratic or black insulating materials can be organic insulating materials, such as black phenolic resin. Besides, before coating the transparent conducting layer, a black matrix 5 should be coated around the second surface 12 of the transparent substrate 1, location of which corresponds to that of the metal circuits 23 to cover the metal circuits 23 so that the metal circuits 23 are not exposed on the surface of the transparent substrate 1, beautifying the touch panel's appearance.

The Third Embodiment

Figure 8:
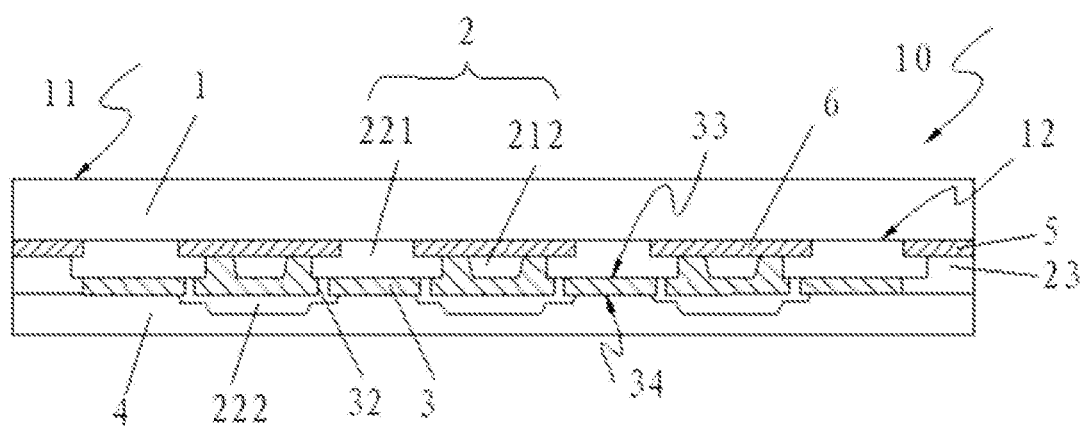
FIG. 8 is a schematic sectional view of the third embodiment of the present disclosure in accordance with B-B shown in FIG. 4.

Referring to FIG. 8, for a capacitive touch panel 10, the structure is similar to the first embodiment, wherein the difference lies in insulation setting. The capacitive touch panel 10 comprises a transparent substrate 1, a sensing circuit layer 2, a protective layer 4, a black matrix 5, a mask layer 6, and an insulating layer 3, which has a plurality of through-holes 32. First-axis electrodes 21 and second-axis electrodes 22 are located on first surface 33 of the insulating layer 3. Each first-axis electrode 21 has a plurality of first electrodes 211 and first-axis wires 212, which connect two adjacent first electrodes 211. Each second-axis electrode 22 has a plurality of second electrodes 221 placed between two corresponding adjacent first-axis electrodes 21, interlacing with the first electrodes 211 at intervals; each second-axis electrode 22 also has a plurality of second-axis wires 222 which are metal jumpers set on the second surface 34 of the insulating layer 3, opposite to the first surface 33. Both ends of each metal jumper pass through the corresponding through-holes 32 respectively and connect the two adjacent second electrodes 221. Location and size of the metal jumper correspond to those of the mask layer 6.

Production of the capacitive touch panel comprises the following steps:

A mask layer 6 is coated on the second surface 12 of the transparent substrate 1, wherein the mask layer 6 comprises of a plurality of mask pieces 6a set on the second surface 12 of the transparent substrate 1 at certain intervals. A transparent conducting layer is coated on the second surface 12 of the transparent substrate 1. A sensing circuit layer 2 is then formed with electrode pattern, wherein the sensing circuit layer 2 comprises a plurality of first electrodes 211, second electrodes 221, and first-axis wires 212, which are connected to two adjacent first electrodes 211. An insulating layer 3 is placed on the sensing circuit layer 2 by using transparent insulting materials and a plurality of through-holes 32 are formed on the second electrodes 221. Then second-axis wires 222 (metal jumpers) and metal circuits 23 are set. In an embodiment, both ends of the metal junipers pass through the corresponding through-holes 32 respectively and connect the two adjacent second electrodes 221. The metal circuits 23 are placed around the sensing circuit layer 2 for transmitting signals. When coating the mask layer 6, black matrix 5 can be coated around the second surface 12 of the transparent substrate 1 synchronously; the black matrix 5 is covered around the second surface 12 of the transparent substrate 1, location of which corresponds to that of the metal circuits 23.

While certain embodiments have been shown and described, various modifications and substitutions may be made thereto without departing from the spirit and scope of the invention. Accordingly, it is to be understood that the present invention has been described by way of illustration and not limitations.

What is claimed is:

1. A capacitive touch panel comprising:
   a transparent substrate comprising a first surface and a second surface opposite to the first surface;
   a sensing circuit layer placed on the second surface of the transparent substrate for sensing touch and generating sense signals, wherein the sensing circuit layer comprises a plurality of first electrodes and a plurality of second electrodes, wherein adjacent first electrodes are electrically connected through a first-axis wire, and wherein a metal jumper is overlapped with adjacent second electrodes to electrically connect the adjacent second electrodes while the metal jumper and the first-axis wire are electrically insulated by an insulating layer, wherein a width of the insulating layer is less than a distance between the adjacent second electrodes that overlap the metal jumper;
   a mask layer, wherein reflectance of the mask layer is lower than that of the metal jumper, and wherein the mask layer is set between the metal jumper and the transparent substrate and interposed between the insulating layer and the transparent substrate to block light reflected by the metal jumper;
   a black matrix laminated around the second surface of the transparent substrate; and
   a protective layer configured to shield electromagnetic noise, wherein the protective layer is set between the black matrix and the transparent substrate.

2. The capacitive touch panel according to claim 1, wherein the mask layer is coated on the second surface of the transparent substrate and comprises a plurality of mask pieces, one of the mask pieces being positioned corresponding to the metal jumper.

3. The capacitive touch panel according to claim 1, wherein the first electrodes and the second electrodes are insulated from each other and set in two mutually vertical directions.

4. The capacitive touch panel according to claim 1, wherein the insulating layer comprises a plurality of insulating sheets.

5. The capacitive touch panel according to claim 4, wherein the insulating sheets are made of melanocratic or black insulating materials.

6. The capacitive touch panel according to claim 1, wherein the black matrix is made of grey, brown or black non-conductive mask material.

7. The capacitive touch panel according to claim 1, wherein the capacitive touch panel further comprises a second protective layer, wherein the second protective layer is placed on a surface of the sensing circuit layer.

8. The capacitive touch panel according to claim 1, wherein the mask layer is made of grey, brown or black non-conductive mask material.

9. The capacitive touch panel according to claim 8, wherein the mask material comprises black photoresistive material, brown photoresistive material, grey photoresistive material, nitride, oxide or a mixture of nitride and oxide.

10. A method for reducing visibility of a metal jumper in a capacitive touch panel comprising:
    providing a transparent substrate, wherein the transparent substrate has a first surface and a second surface opposite to the first surface;
    coating a transparent conductive layer on the second surface of the transparent substrate;
    forming a sensing circuit layer on the second surface of the transparent substrate by patterning the transparent conductive layer, wherein the sensing circuit layer comprises a plurality of first electrodes and a plurality of second electrodes, wherein adjacent first electrodes are electrically connected through a first-axis wire;
    placing an insulating layer on the first-axis wire after patterning the transparent conductive layer, wherein a width of the insulating layer is less than a distance between adjacent second electrodes;
    forming the metal jumper across the insulating layer, the metal jumper overlapping and electrically connecting the adjacent second electrodes, wherein the metal jumper and the first-axis wire are electrically insulated by the insulating layer; and
    placing a mask layer, wherein reflectance of the mask layer is lower than that of the metal jumper, wherein the mask layer is set between the transparent substrate and the metal jumper and interposed between the insulating layer and the transparent substrate, wherein the mask layer is coated on the second surface of the transparent substrate, and wherein the mask layer comprises a plurality of mask pieces, and one of the mask pieces corresponding to the metal jumper.

11. The method for reducing visibility of the metal jumper in the capacitive touch panel according to claim 10, wherein the insulating layer comprises a plurality of insulating sheets, and wherein the insulating sheets are set at intersections of the first-axis wires and the metal jumper.

12. The method for reducing visibility of the metal jumper in the capacitive touch panel according to claim 10, wherein the mask layer is made of grey, brown or black non-conductive mask material.

13. The method for reducing visibility of the metal jumper in the capacitive touch panel according to claim 12, wherein the mask material comprises black photoresistive material, brown photoresistive material, grey photoresistive material, nitride, oxide or a mixture of nitride and oxide.

14. The method for reducing visibility of the metal jumper in the capacitive touch panel according to claim 11, wherein the insulating sheets are made of melanocratic or black insulating materials.

15. The method for reducing visibility of the metal jumper in the capacitive touch panel according to claim 10, wherein the metal jumper is overlapped with the adjacent second electrodes, and a length of the metal jumper is equal to the distance between the adjacent second electrodes.

16. The capacitive touch panel according to claim 1, wherein the mask layer is made up of a plurality of mask pieces, and wherein an area of each mask piece is equal to $10^{-4}$ mm$^2$.

17. The method for reducing visibility of the metal jumper in the capacitive touch panel according to claim 10, further comprising forming a black matrix laminated around the second surface of the transparent substrate, wherein the mask layer is made synchronously with the black matrix.

18. A method for reducing visibility of a metal jumper in a capacitive touch panel comprising:
   providing a transparent substrate, wherein the transparent substrate has a first surface and a second surface opposite to the first surface;
   coating a transparent conductive layer on the second surface of the transparent substrate;
   forming a sensing circuit layer on the second surface of the transparent substrate by patterning the transparent conductive layer, wherein the sensing circuit layer comprises a plurality of first electrodes and a plurality of second electrodes, wherein adjacent first electrodes are electrically connected through a first-axis wire;
   placing an insulating layer on the first-axis wire after patterning the transparent conductive layer, wherein a width of the insulating layer is less than a distance between adjacent second electrodes;
   forming the metal jumper across the insulating layer, the metal jumper overlapping and electrically connecting the adjacent second electrodes, wherein the metal jumper and the first-axis wire are electrically insulated by the insulating layer; and
   placing a mask layer, wherein reflectance of the mask layer is lower than that of the metal jumper, wherein the mask layer is set between the transparent substrate and the metal jumper and interposed between the insulating layer and the transparent substrate, wherein the metal jumper is overlapped with the adjacent second electrodes, and a length of the metal jumper is equal to the distance between the adjacent second electrodes.

19. The method for reducing visibility of the metal jumper in the capacitive touch panel according to claim 18, wherein the insulating layer comprises a plurality of insulating sheets, and wherein the insulating sheets are set at intersections of the first-axis wires and the metal jumper.

20. The method for reducing visibility of the metal jumper in the capacitive touch panel according to claim 18, wherein the mask layer is made of grey, brown or black non-conductive mask material.

21. The method for reducing visibility of the metal jumper in the capacitive touch panel according to claim 20, wherein the mask material comprises black photoresistive material, brown photoresistive material, grey photoresistive material, nitride, oxide or a mixture of nitride and oxide.

22. The method for reducing visibility of the metal jumper in the capacitive touch panel according to claim 19, wherein the insulating sheets are made of melanocratic or black insulating materials.

23. The method for reducing visibility of the metal jumper in the capacitive touch panel according to claim 18, further comprising forming a black matrix laminated around the second surface of the transparent substrate, wherein the mask layer is made synchronously with the black matrix.

* * * * *